United States Patent
Rembaum et al.

[15] 3,641,470
[45] Feb. 8, 1972

[54] PRESSURE TRANSDUCER

[72] Inventors: Alan Rembaum, Altadena, Calif.; Allen M. Hermann, New Orleans, La.

[73] Assignee: California Institute of Technology, Pasadena, Calif.

[22] Filed: Sept. 18, 1969

[21] Appl. No.: 858,950

[52] U.S. Cl. ................................. 338/99, 338/36, 338/100
[51] Int. Cl. .................................................... H01c 9/06
[58] Field of Search ................. 338/36, 99, 100, 114, 47

[56] References Cited

UNITED STATES PATENTS 2,951,817  9/1960  Myers ............................. 338/100 X
3,451,032  6/1969  Tempel .............................. 338/114

*Primary Examiner*—Rodney D. Bennett, Jr.
*Assistant Examiner*—R. Kinberg
*Attorney*—Sokolski & Wohlgemuth

[57] ABSTRACT

Crystals of a monomeric charge-transfer complex of pyrenetetracyanoethylene are found to have an electrical conductivity that is extremely pressure dependent, such that these crystals can form the sensing element of a novel pressure transducer.

6 Claims, 2 Drawing Figures

PATENTED FEB 8 1972

3,641,470

PRESSURE DEPENDENCE OF THE RESISTIVITY OF PYRENE - TCNE
CHARGE-TRANSFER COMPLEX

INVENTORS
ALAN REMBAUM
ALLEN M. HERMANN

BY
Soledski Wohlgemuth

PRESSURE TRANSDUCER

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

This invention is in the field of pressure transducers. More particularly, the invention relates to the novel utilization of a particular monomeric charge-transfer complex as a sensing element in a pressure transducer and the resulting transducer which possesses high-pressure sensitivity.

2. Description of the Prior Art

Prior to the herein invention, several studies have been conducted relating to the pressure dependence of the conductivity of organic semiconductors. The studies have included materials such as polycyclic aromatic hydrocarbons, polymers, charge-transfer complexes, free radicals polymers such as polyvinyl-anthracene-iodine and monomeric charge-transfer complexes. From the studies of these various materials, it was found that their electrical conductivity increased by a factor of from 10 to 10,000 for a tenfold increase of pressure. In other words, the maximum sensitivity of the prior art organic semiconductor devices was a three order magnitude increase in conductivity for a tenfold increase in pressure. This range of sensitivity was not sufficient to provide widespread utilization of these materials for pressure transducers.

OBJECTS AND SUMMARY OF THE INVENTION

Thus, an object of this invention is to provide a pressure transducer utilizing a novel sensing element.

A further object of this invention is to provide a sensing element for a pressure transducer which possesses a significantly greater sensitivity to increase in pressure than similar prior art materials.

The above and other objects of the invention are derived from the utilization of the monomeric charge-transfer complex pyrene-tetracyanoethylene as the sensing element in a pressure transducer. This charge-transfer complex can be provided in the form of a polycrystalline powder comprised of a plurality of crystals, or preferably one relatively large single crystal to which can be attached conductive electrodes. Leads from these electrodes then will reflect the changed conductivity of the complex when subjected to compression in a direction normal to the plates. Further, the item can be encapsulated in a flexible protective housing such that it can be utilized in underwater environments and the like, to obtain depth measurements and other desirable pressure data. As will be shown, the charge-transfer complex has an electroconductivity which is much more sensitive to pressure other than other charge-transfer complexes.

DESCRIPTION OF THE PREFERRED EMBODIMENTS

Prior to the herein invention, the complex of pyrene and tetracyanoethylene, hereinafter referred to as TCNE, was known.

Unexpectedly, however, in the course of the development of the herein invention, it has been found that this complex has an electrical resistivity that is much more sensitive to pressure than any other known material of a similar nature.

The complex of pyrene and TCNE is prepared by preferably dissolving approximately equal portions of these materials in a suitable solvent such as ethylacetate. Additional other suitable solvents will include, for example, benzene, toluene, tetrahydrofuran and the like.

The two components can be dissolved in a large excess of solvent without heating. However, it is preferable to dissolve each component in solvent and heat same to between about 50° and 80° C. or up to the boiling point of the solvent. The individual heated solutions are then mixed together. The solution of pyrene and TCNE may be evaporated in a beaker under a hood or in a flask by applying a low vacuum. The size of the resulting crystals depends on the time period of evaporation. The slower the rate the evaporation the larger the crystals obtained. After formation of the crystals, they are filtered from the remaining solvent in the reaction vessel.

It is often desirable to provide the resulting complex in the form of a single crystal to which conductive plates could be adequately bonded. The process to obtain a single crystal is the same as previously described for several crystals, however the solvent is evaporated much slower. A typical crystal on the order to 3×4 millimeters/2 millimeters thick can thus be formed upon slow evaporation over, for example, a several day period. This slow evaporation might occur, for example, under a nitrogen gas atmosphere.

In addition to providing a single relatively large crystal, a pellet of many small crystals can be used. It has been found that ground or crushed crystals of the complex can be pressed into a coherent pellet mass; this pellet can be utilized in the same manner as a single crystal with good results. As can be appreciated, the formation of such a pellet enables one to control the size of the sensing element formed from the complex.

Figure 1:
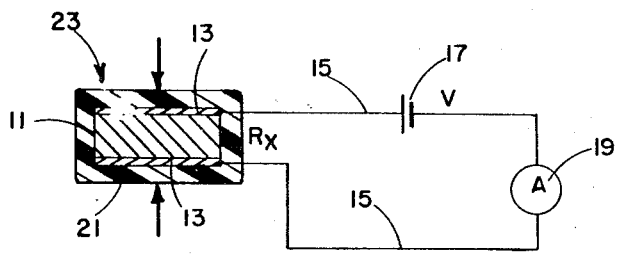
FIG. 1 is a schematic diagram of a technical pressure transducer of the invention, together with a circuit in which it would be utilized.

Referring to FIG. 1, there is seen a single crystal 11 of the pyrene-TCNE complex. To the opposite largest surfaces of the crystal are bonded conductive plates 13 which can be formed of silver or other suitable highly conductive material. The plates can be bonded to the crystal by silver paste, solder or other like conductive adhesive-type material.

Individual leads 15 are affixed to each of the plates 13 and are directed to both a power source 17 and a meter 19 forming a circuit such that the variance in conductivity of the complex 11 can be adequately measured with changes in external pressure upon the plates 13. The power source can supply virtually any voltage up to 100 volts. Above this excessive heating will occur. Voltages as low as microvolts can be used provided the current is sufficient to achieve the desired results.

For many applications it is particularly desirable that the crystalline complex 11, together with its associated plates 13 be isolated from the surrounding environment. This is particularly so when the device would be utilized in underwater environments. Thus, the crystal and plates may be encapsulated by with a suitable material 21 which can be a flexible resin material such as epoxy resins, alkyd resins and other known coatings. Additionally, a rubber base material can be used. The main requirements of the encapsulating material 21, of course, is that it be flexible and allow deflection of the plates 21 to provide a compression of the crystal 11, when pressure is exerted in the direction of the arrow shown.

It should be pointed out that the resulting pressure transducer 23 shown in FIG. 1 is not of an inherently novel construction and that wide latitude can be utilized in designing such a transducer. The novelty of the transducer, however, lies in the particular use of the complex of pyrene and TCNE as a sensing element 11 to provide the unusual and unexpected highly sensitive pressure dependence.

Though the specific embodiment shown discloses conductive plates affixed to the crystal complex material, mere electrical leads can be bonded to the surfaces of a single crystal or pellet and the desired results obtained. Thus, any suitable conductive electrode material is contemplated.

It is believed that the invention will be better understood from the following detailed example:

EXAMPLE

Equal molar portions of pyrene and TCNE were dissolved in ethylacetate. Specifically, 2.02 g. of pyrene was dissolved in 50 ml. of ethylacetate and the mixture heated until the pyrene dissolved. 1.28 g. of TCNE was dissolved in 50 ml. of ethylacetate and mixture heated until the TCNE dissolved. The two hot solutions were then mixed together in a glass vessel. After the solution was achieved, the mixture was then allowed to stand under a hood and the solvent slowly evaporated over a period of 12 hours. Remaining in the bottom of the vessel were dark blue crystals of the complex of pyrene and TCNE. The crystals were then filtered from the remaining solvent.

The resulting crystals were then ground in a motar. This was done to prevent the crystals from exploding out of the pressure apparatus used, as well as insuring a high density of the crystals per volume within the pressure apparatus.

The ground crystals were then placed in a pressure apparatus which utilized two opposed vanadium alloy steel anvils having a diameter of one-fourth of an inch. The anvils were connected by leads to a Keithey Electrometer such that resistivity determinations could be made. This test arrangement is described on page 82 of *Progress in Dielectrics*, Vol. 6, Academic Press, Inc., (1965). The anvils were placed in a hydraulic press type of pressure apparatus so that various pressures could be applied between them. Care was taken to ensure that any spurious voltages across the samples were a factor of 100 or greater less than the applied voltage. All the measurements resulting from varying the pressure on the crystals between the anvils was made at room temperature. The results are shown in the graph of FIG. 2 as indicated by the squares.

Figure 2:
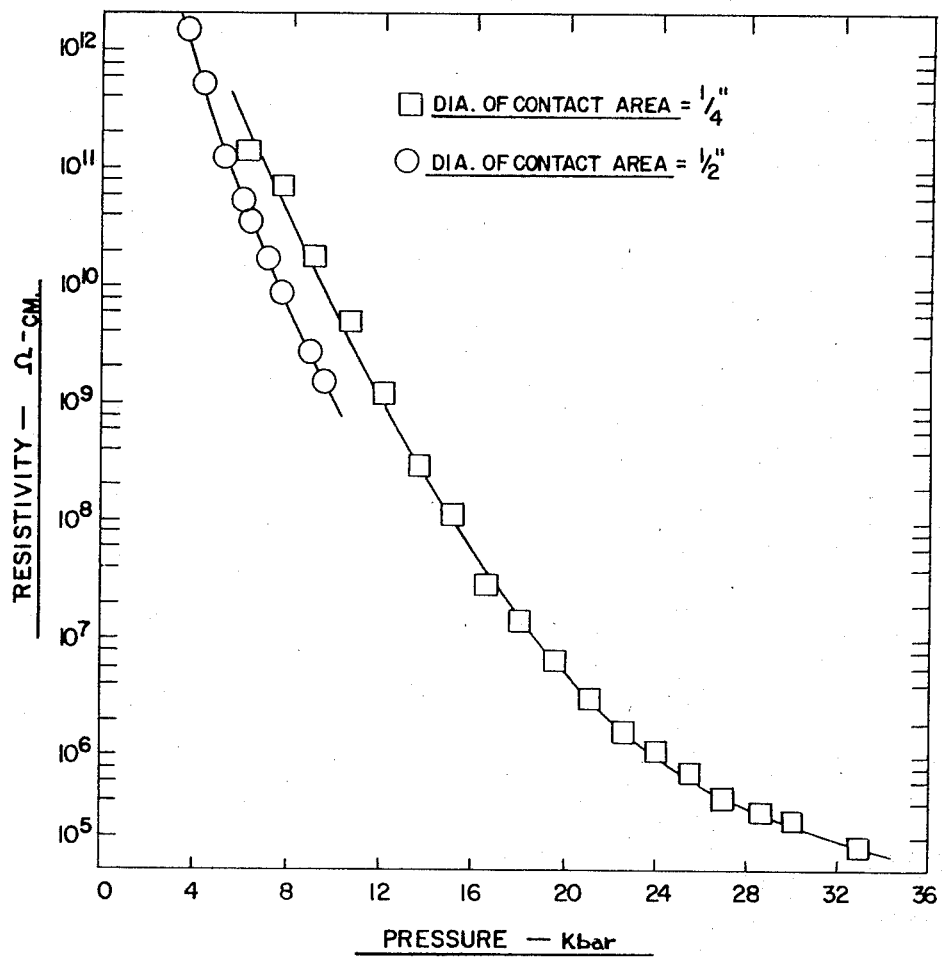
FIG. 2 is a chart disclosing the change in resistivity of the complex of the material in relation to pressure.

When the same example was repeated utilizing one-half inch diameter anvils the results obtained were as indicated on the graph of FIG. 2 is indicated by the circles. As can be seen, the resistivity of the crystals decreases by a factor of 7 orders of magnitude between 3.5 and 33 kilobars. This is believed to be the largest reported decrease in resistivity for any known charge transfer complexes and polymers over such a pressure range. Although the results shown in FIG. 2 are with regard to plurality of fine crystals between conductive plates, it should be pointed out that essentially the same results will be achieved from a single large crystal.

What is claimed is:

1. A pressure transducer comprising:
   two spaced-apart electrically conductive electrode surfaces, and
   a sensing element disposed between said surfaces formed of the charge-transfer complex of pyrene-tetracyanoethylene.

2. The transducer of claim 1 wherein said sensing element is comprised of a plurality of crystals.

3. The transducer of claim 1 wherein said sensing element is a pellet formed from a plurality of pressed crystals.

4. The transducer of claim 1 wherein the sensing element is comprised of a single crystal.

5. The transducer of claim 4 wherein:
   said electrically conductive electrode surfaces are bonded to opposite sides of said crystal.

6. The transducer of claim 4 further comprising:
   encapsulating said sensing element and electrode surfaces in a flexible housing.

* * * * *